United States Patent
Mikan et al.

(10) Patent No.: US 7,996,048 B1
(45) Date of Patent: Aug. 9, 2011

(54) ENHANCED CALL RECEPTION AND PRIVACY

(75) Inventors: Jeffrey Mikan, Cumming, GA (US); Justin McNamara, Atlanta, GA (US); Fulvio Cenciarelli, Suwanee, GA (US); Anastasios L. Kefalas, Alpharetta, GA (US); John Ervin Lewis, Lawrenceville, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 887 days.

(21) Appl. No.: 11/615,156

(22) Filed: Dec. 22, 2006

(51) Int. Cl.
*H04B 1/38* (2006.01)
*H04M 1/00* (2006.01)

(52) U.S. Cl. .................. 455/570; 455/63.1; 455/114.2; 455/222; 455/278.1; 381/71.1; 381/94.1; 379/406.01; 379/406.05

(58) Field of Classification Search .................. 455/570, 455/63.1, 114.2, 222, 278.1, 296; 381/71.1, 381/94.1; 379/406.01–406.16
See application file for complete search history.

(56) References Cited

U.S. PATENT DOCUMENTS
2003/0003944 A1 * 1/2003 Rosenzweig ............... 455/550
2008/0118081 A1 * 5/2008 Chang ....................... 381/94.1
* cited by examiner

*Primary Examiner* — Tuan A Pham
(74) *Attorney, Agent, or Firm* — Woodcock Washburn LLP

(57) ABSTRACT

An audio interface adapted to reduce a subscriber voice may receive a subscriber voice and a background noise. The subscriber voice may then be compared to the to the background noise. If the received subscriber voice is louder than the received background noise, the audio interface may output a message to the cellular telephone subscriber indicating the subscriber may reduce his speaking volume. Additionally, an audio interface may process a voice waveform that corresponds to the subscriber voice and a background waveform that corresponds to the background noise to generate a substantially opposite voice waveform and a substantially opposite background waveform respectively. The substantially opposite voice waveform and background waveform may be substantially out of phase from the voice waveform and background waveform respectively and output via one or more output ports of the audio interface.

10 Claims, 7 Drawing Sheets

US 7,996,048 B1

ENHANCED CALL RECEPTION AND PRIVACY

BACKGROUND

Today, cellular telephones have become one of the most popular ways of communicating with others, because of their mobility, convenience and ease of use. In fact, in every crowd, there may be someone talking on his or her cellular telephone.

Frequently, a cellular telephone subscriber (or the user of any type of wireless device) may need to have a conversation in an area where other people are present. In such a situation, it may not be possible for the person to go to a sparsely-populated area for privacy (e.g., a train, taxi, etc.). Thus, if the subscriber would prefer that his or her conversation not be overheard, the subscriber's only choices are to reschedule the call for a later time when other people will not be present, or to speak very quietly while still speaking loudly enough for the party on the far end of the call to understand.

Unfortunately, if the subscriber decides to place or take a call while in an area where other people are present, background noise may prevent the subscriber from being able to speak quietly. Instead, the subscriber may have to speak loud enough for the party on the far end of the call to understand, which may be loud enough to be overheard by other people near the subscriber. Furthermore, even if the background noise can be reduced on the far end of the call, the subscriber may not speak as quietly as possible. For example, the subscriber may speak louder than necessary, because he or she does not realize the party on the other end would be able to hear at a lower speaking volume. Thus, the subscriber's conversation may be heard unnecessarily in an area where other people may be, merely because the subscriber was unaware he could speak quieter even with the background noise.

SUMMARY

In view of the above shortcomings and drawbacks, methods and systems are provided that reduce a volume of a cellular telephone subscriber voice in a surrounding area. According to an example embodiment, an audio interface receives a subscriber voice and a background noise via an input port. The subscriber voice may then be compared to the to the background noise. If the received subscriber voice exceeds a volume of the received background noise by a predetermined threshold, the audio interface may output a message to the cellular telephone subscriber.

According to another example embodiment, an audio interface receives a subscriber voice and a background noise via an input port. A voice waveform that corresponds to the subscriber voice may then be processed to generate a substantially opposite waveform. The substantially opposite waveform may be substantially out of phase from the voice waveform. Additionally, the opposite waveform may be output in the same direction as the subscriber voice.

DETAILED DESCRIPTION

Figure 1A:
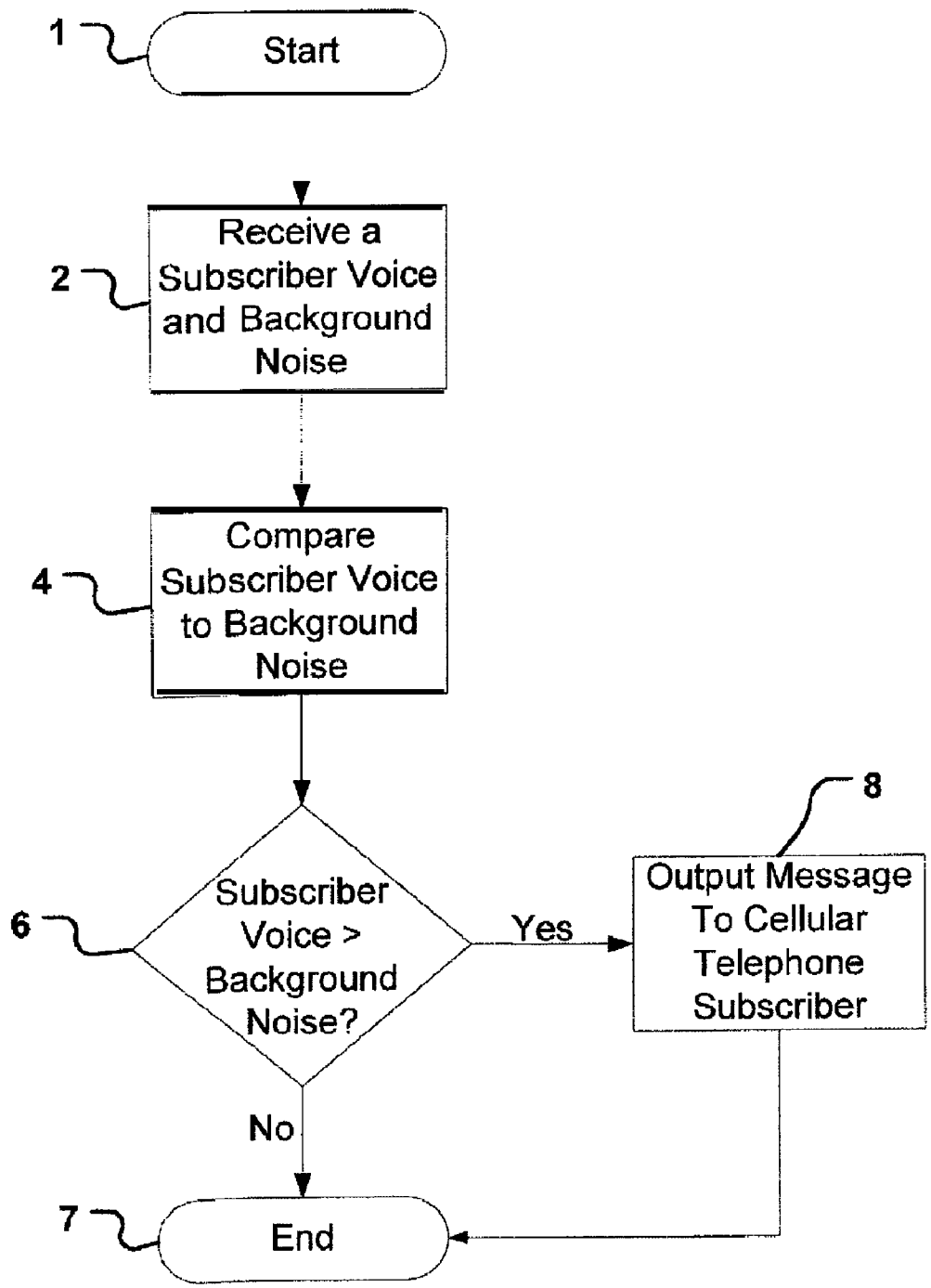
FIG. 1A depicts an example method of reducing a cellular telephone subscriber voice.

FIG. 1A depicts an example method of reducing a wireless device subscriber voice. As shown in FIG. 1A, at 2, a subscriber voice and background noise may be received by an audio interface in a wireless device such as a cellular telephone, PDA or the like. The subscriber voice may include, for example, the voice of a subscriber speaking to someone via a cellular telephone. The background noise may include the noise surrounding the subscriber using the cellular telephone. For example, the background noise may the noise from include trains, cars, and other people. The subscriber voice and the background noise may be received at an input port such as, for example, one or more microphones on the cellular telephone in communication with the audio interface.

At 4, the subscriber voice and background noise received by the audio component may be compared to the background noise. The subscriber voice and background noise may be filtered as separate sound signals. After separating, a processor may compare the volume of the subscriber voice to the volume of the background noise. For example, the processor may compare the amplitude of the subscriber voice sound signal to the amplitude of the background noise sound signal.

If, at 6, the volume of the subscriber voice is greater than the volume of the background noise, a message may be output to a cellular telephone subscriber indicating he may talk a lower volume at 8. The message may include, for example, an audio message output to the subscriber via a speaker on the cellular telephone. The message may also include, for example, a visual alert displayed to the cellular telephone subscriber such as a blinking light that illuminates on the cellular telephone.

Figure 1B:
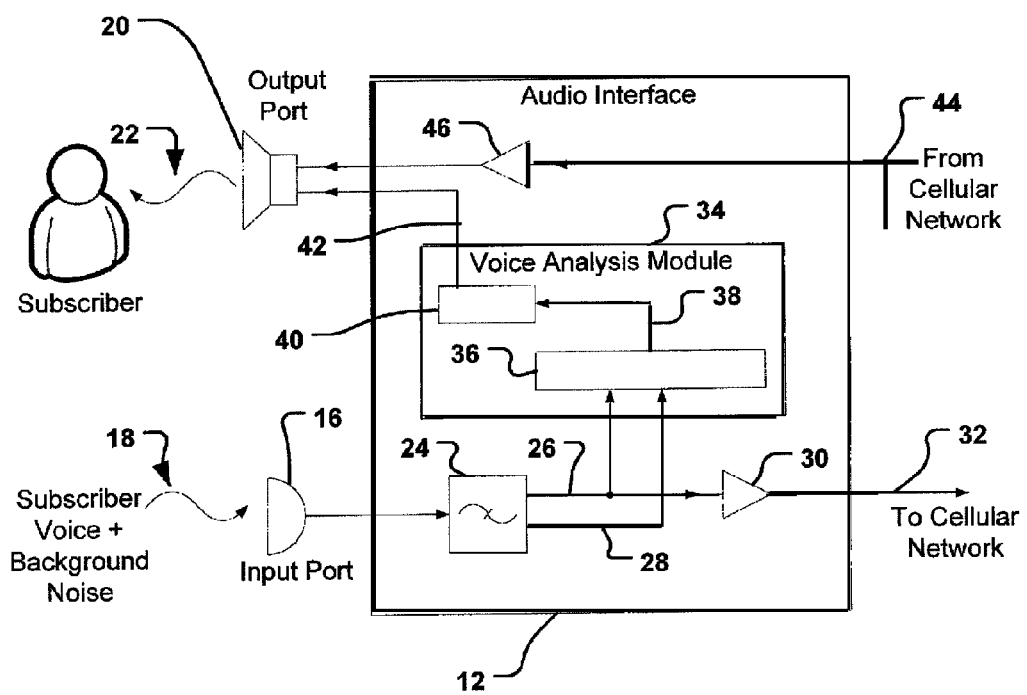
FIG. 1B depicts an example embodiment of an audio interface adapted to reduce a cellular telephone subscriber voice.

FIG. 1B depicts an example embodiment of an audio interface adapted to reduce a cellular telephone subscriber voice. As shown in FIG. 1B, a portion of cellular telephone 10 includes audio interface 12, input port 16 and output port 20. Input port 16 may be, for example, a microphone adapted to receive a subscriber voice and background noise 18. Alternatively, input port 16 may he, for example, multiple microphones including typical microphones and speakerphone microphones adapted to receive the subscriber voice and background noise as separate signals. The subscriber voice may include, for example, the voice of a subscriber speaking to someone via a cellular telephone. The background noise may include the noise surrounding the subscriber using the cellular telephone. For example, the background noise may include the sounds of trains, cars, and other people. Input port 16 may be in operative communication with audio interface 12 such that subscriber voice and background noise 18 that is received by input port 16 may be input into audio interface 12. Output port 20 may be in communication with audio interface 12. Output port 20 may include, for example, a speaker adapted to output a voice from someone on the far end of the conversation to the subscriber received from the network via pathway 44. Pathway 44 may include, for example, a wireless transmission path, an optical transmission path, a conductive transmission path, or the like such that output port 20 may receive and output the voice from someone on the far end of the conversation to the subscriber. The volume of the voice received via pathway 44 may be increased via amplifier 46 before being received by output port 20. The amplified voice at the far end of the conversation may be heard by the subscriber from output port 20 via sound signal 22. Output port 20 may also be adapted to output messages corresponding to the received subscriber voice and background noise 18, which will be described in more detail below.

Audio interface 12 may include filter 24. Filter 24 may receive subscriber voice and background noise 18 via input port 16. Filter 24 may filter the sound signal corresponding to the subscriber voice from the background noise such that the filtered subscriber voice may be output from filter 24 via pathway 26 and the filtered background noise may be output from filter 24 via pathway 28. Filter 24 may include, for example, an adaptive filter or any other circuitry and/or software that filters the subscriber voice from background noise. Pathways 26 and 28 may include, for example, a wireless transmission path, an optical transmission path, a conductive transmission path, or the like such that voice analysis module 34 may receive the filtered subscriber voice and background noise from filter 24. The subscriber voice output via pathway 26 may be input into amplifier 30, such that, amplifier 30 increases the volume of the filtered subscriber voice. The amplified subscriber voice may then be sent using pathway 32 to the cellular network, where the network may direct the amplified subscriber voice to a party on the other end of the call. Pathway 32 may include, for example, a wireless transmission path, an optical transmission path, a conductive transmission path, or the like such that the cellular network may receive the amplified subscriber voice.

As shown in FIG. 1B, voice analysis module 34 may be in operative communication with input port 16 and filter 24. The subscriber voice and background noise may be input into voice analysis module 34 via their respective pathways 26 and 28. Voice analysis module 34 may include processor 36 and memory module 40. Processor 36 may compare the subscriber voice with the background noise received via pathways 26 and 28. For example, processor 36 may compare the amplitude of the subscriber voice to the amplitude of the background noise. If the amplitude of the subscriber voice is greater than, for example, a predetermined threshold or the amplitude of the background noise, processor 36 may send a signal via pathway 38 indicating that the subscriber may speak at a lower volume. Voice analysis module 34 may also be coupled to input port 16 to provide feedback to input port 16 such that the gain of input port 16 may be adjusted based on the compared subscriber voice and background noise.

Memory module 40 may include, for example, circuitry that stores information such as audio messages or visual indicator signals. Memory module 40 may receive the signal indicating that the user may speak at a lower volume via pathway 38. If memory module 40 receives such a signal from processor 36 via pathway 38, a stored message may be output from memory module 40 via pathway 42. The stored message may indicate to the subscriber that he or she may speak at a lower volume. The stored message may include, for example, an audio message or tone output to the subscriber via output port 20. Alternatively, the stored message may also include, for example, a visual alert displayed to the telephone subscriber.

Output port 20 may receive the stored message via pathway 42. Pathway 42 may include, for example, a wireless transmission path, an optical transmission path, a conductive transmission path, or the like such that output port 20 may receive the stored message from memory module 40. The message then may be output via output port 20 as sound signal 22. Sound signal 22 may be heard by the subscriber speaking on the cellular phone.

Figure 2A:
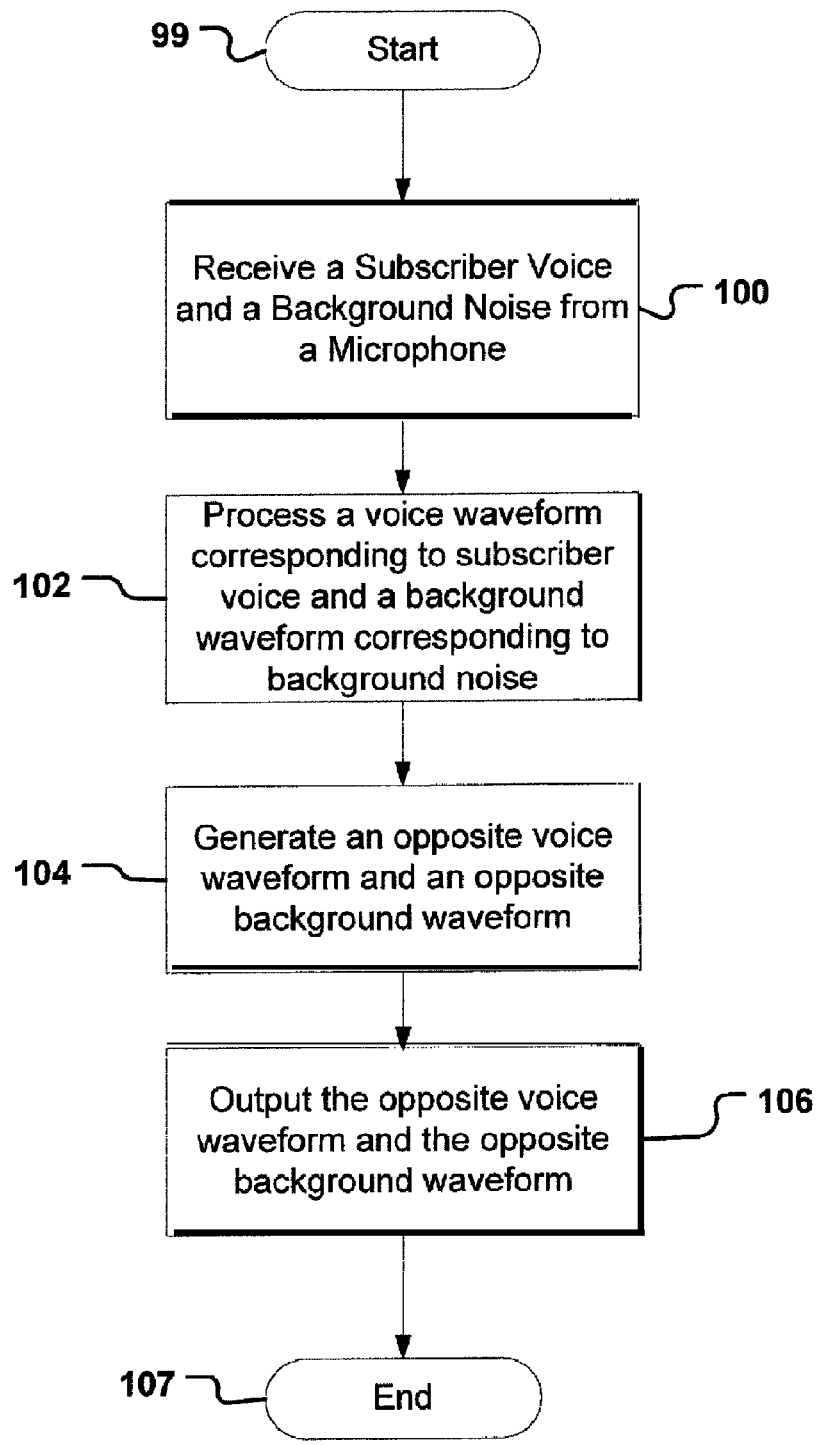
FIG. 2A depicts another example method of reducing a cellular telephone subscriber voice.

FIG. 2A depicts another example method of reducing a telephone subscriber voice. As shown in FIG. 2A, at 100, a subscriber voice and background noise may be received by an audio interface in a wireless device such as a cellular telephone, PDA or the like. The subscriber voice may include, for example, the voice of a subscriber speaking to someone via a cellular telephone. The background noise may include the noise surrounding the subscriber using the cellular telephone. For example, the background noise may include the sound of trains, cars, or other people. The subscriber voice and the background noise may be received at an input port such as, for example, one or more cellular telephone microphones that are in operative communication with the audio component.

At 102, a voice waveform corresponding to the subscriber voice may be processed. Additionally, a background waveform corresponding to the background noise may be processed. For example, the subscriber voice and background noise received at 100 may be filtered as separate sound signals. After the separation, a cancellation module may process a voice waveform corresponding to the received subscriber voice and a background waveform corresponding to the received background noise. The cancellation module may include, for example, a software application and a processor that receives the filtered subscriber voice and processes or analyzes the corresponding sound signals as the voice waveform and background waveform.

At 104, an opposite voice waveform may be generated. Additionally, an opposite background waveform may be generated. The cancellation module may generate an opposite voice waveform based on the voice waveform and an opposite background waveform based on the background waveform processed at 102. For example, the opposite voice waveform may include a sound signal that may be the mirror image (e.g., 180 degrees out of phase) with the received subscriber voice. Thus, when the opposite waveform is output in substantially the same direction as the subscriber voice, the sound signals tend to cancel each other out, thereby reducing the subscriber voice in that direction. Additionally, the opposite background waveform may include a sound signal that may be the mirror image (e.g., 180 degrees out of phase) with the received background noise. Thus, when the opposite background waveform is in substantially the same direction as the subscriber, the sound signals tend to cancel each other out, thereby reducing the background noise heard by the subscriber.

At 106, the opposite voice waveform may be output from the audio interface using a voice cancellation output port. The voice cancellation output port may include, for example, a speaker. The voice cancellation output port may be oriented on a cellular telephone that houses the audio interface in substantially the same direction as the subscriber voice tends to be propagated to nearby non-subscribers in the surrounding area. For example, the voice cancellation output port may be oriented such that when the opposite waveform is output therefrom, the opposite waveform and the subscriber voice substantially cancel each other out thereby reducing the subscriber voice in that direction. Additionally, the opposite background waveform may be output from the output port used by the subscriber to hear the person on the other end of the call. Thus, when the opposite background waveform is output via the output port, the background noise and the opposite background noise waveform signals tend to cancel each other out, thereby reducing the background noise heard by the subscriber.

Figure 2B:
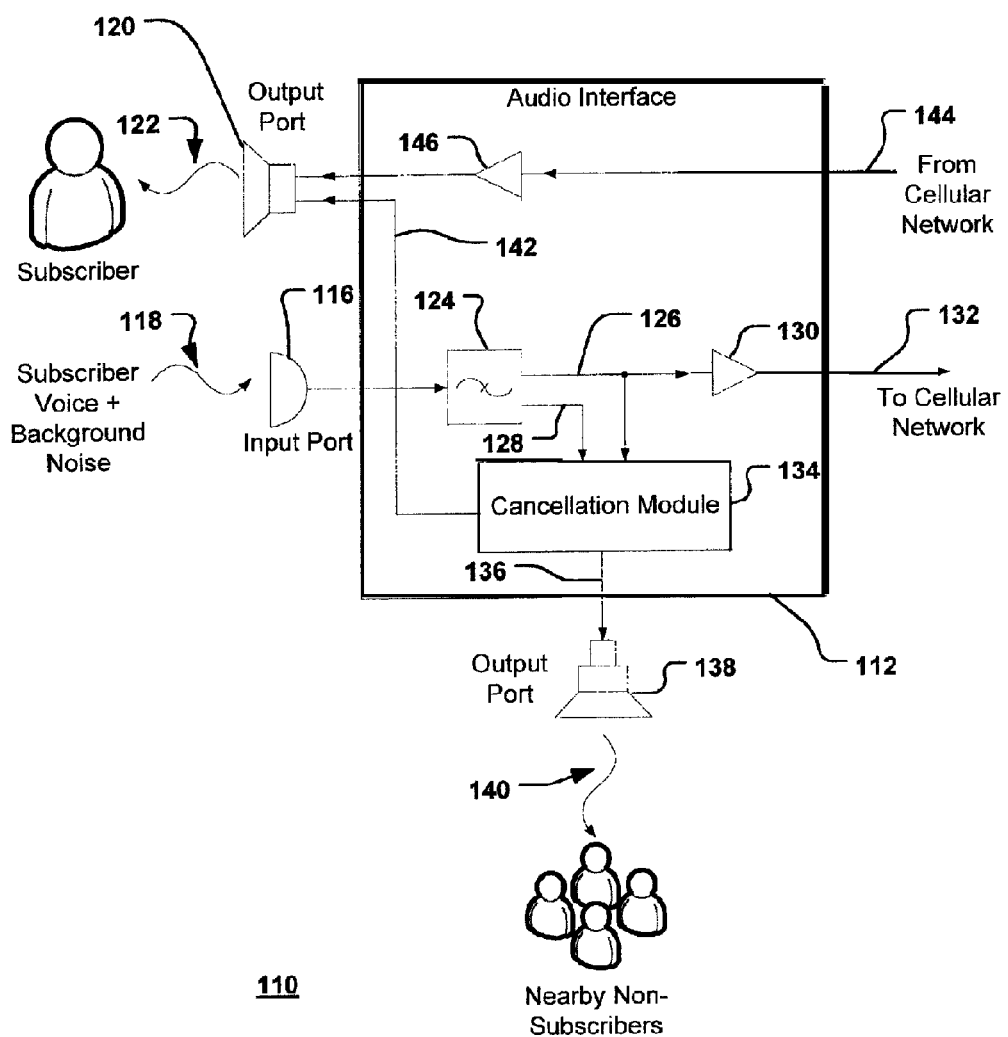
FIG. 2B depicts another example embodiment of an audio interface adapted to reduce a cellular telephone subscriber voice.

FIG. 2B depicts another example embodiment of an audio interface adapted to reduce a cellular telephone subscriber voice. As shown in FIG. 2B, a portion of cellular telephone 110 includes audio interface 112, input port 116, output port 120, and voice cancellation output port 138. Input port 116 may be, for example, a microphone adapted to receive a subscriber voice and background noise 118. Alternatively, input port 116 may be, for example, multiple microphones including typical microphones and speakerphone microphones adapted to receive the subscriber voice and background noise as separate signals. The subscriber voice may include, for example, the voice of a subscriber speaking to someone via a cellular telephone. The background noise may include the noise surrounding the subscriber using the cellular telephone. For example, the background noise may include the sounds of trains, cars, and other people. Input port 116 may be in operative communication with audio interface 112 such that subscriber voice and background noise 118 received by input port 116 may be input into audio interface 112. Output port 120 may be in communication with audio interface 112. Output port 120 may include, for example, a speaker adapted to output a voice from someone on the far end of the conversation to the subscriber received from the network via pathway 144. Pathway 144 may include, for example, a wireless transmission path, an optical transmission path, a conductive transmission path, or the like such that output port 120 may receive and output the voice from someone on the far end of the conversation to the subscriber. The volume of the voice received via pathway 144 may be increased via amplifier 146 before being received by output port 120. The amplified voice at the far end of the conversation may be heard by the subscriber from output port 120 via sound signal 122. In one embodiment, output port 120 may further be adapted to output a waveform opposite of the background noise to the subscriber, which will be described in more detail below. Voice cancellation output port 138 may be in communication with audio interface 112. Voice cancellation output port 138 may include, for example, a speaker adapted to output a waveform opposite of the subscriber voice, which will be described in more detail below. Additionally, voice cancellation output port 138 may be part of output port 120 or may be one or more separate speakers in operative communication with the audio interface 112.

Audio interface 112 may include filter 124. Filter 124 may receive subscriber voice and background noise 118 via input port 116. Filter 124 may filter the sound signal corresponding to the subscriber voice from the background noise such that the filtered subscriber voice may be output from filter 124 via pathway 126 and the filtered background noise may be output from filter 124 via pathway 128. Filter 124 may include, for example, an adaptive filter or any other circuitry and/or software that filters the subscriber voice from background noise. Additionally, pathways 126 and 128 may include, for example, a wireless transmission path, an optical transmission path, a conductive transmission path, or the like. The subscriber voice output via conductive pathway 126 may be input into an amplifier 130 such that amplifier 130 increases the volume of the filtered subscriber voice. The amplified subscriber voice may then be sent using pathway 132 to the cellular network, where the network may direct the amplified subscriber voice to a party on the other end of the call. Pathway 132 may include, for example, a wireless transmission path, an optical transmission path, a conductive transmission path, or the like such that the cellular network may receive the amplified subscriber voice.

As shown in FIG. 2B, cancellation module 134 may be in operative communication with input port 116 and filter 124. The filtered subscriber voice signal may be input into cancellation module 134 via pathway 126. Similarly, the filtered background noise signal may be input into cancellation module 134 via pathway 128. Cancellation module 134 may process a voice waveform corresponding to the subscriber voice received via pathway 126 and a background waveform corresponding to the background noise received via pathway 128. Cancellation module 134 may generate a substantially opposite voice waveform based on the processed voice waveform and a substantially opposite background waveform based on the processed background waveform (e.g., 180 degrees out of phase). The opposite voice waveform and opposite background waveform may include sound signals that may be the mirror image of the subscriber voice and background noise respectively. Thus, when the opposite voice waveform tends to be output in the same direction as the subscriber voice, the sound signals may cancel each other out thereby reducing the subscriber voice in that direction. Additionally, when the opposite background waveform is output in substantially the same direction as subscriber, the sound signals may cancel each other out, thereby reducing the background noise heard by the subscriber. Cancellation module 134 may include, for example, a software application and a processor that receives the subscriber voice, processes or analyzes the corresponding sound signal as the voice waveform and generates an opposite waveform therefrom.

The opposite voice waveform may be output from audio interface 112 via voice cancellation output port 138. In one embodiment, voice cancellation output port 138 may be oriented on a cellular telephone that houses the audio interface in substantially the same direction as the subscriber voice tends to be propagated to nearby non-subscribers in the surrounding area. For example, voice cancellation output port 138 may be oriented such that when the opposite waveform may be output therefrom, the opposite voice waveform and the subscriber voice cancel each other out thereby reducing the subscriber voice in that direction.

Voice cancellation output port 138 may receive the opposite voice waveform via pathway 136. Pathway 136 may include, for example, a wireless transmission path, an optical transmission path, a conductive transmission path, or the like such that voice cancellation output port 138 may receive the opposite voice waveform from cancellation module 134. The opposite voice waveform may then be output via voice cancellation output port 138 as opposite voice waveform sound signal 140 thereby reducing the ability of a nearby non-subscriber to hear the subscriber's conversation. Audio interface 112 may further be adapted to provide feedback to the subscriber on which direction he may face to decrease or otherwise better enable the cancellation of the sound of his voice to nearby non-subscribers.

In one embodiment, the opposite background waveform may be output from audio interface 112 via output port 120. Thus, when the opposite background waveform is output via the output port, the background noise and the opposite background noise waveform signals may cancel each other out, thereby reducing the background noise heard by the subscriber.

Output port 120 receives the opposite background waveform via pathway 142. Pathway 142 may include, for example, a wireless transmission path, an optical transmission path, a conductive transmission path, or the like such that output port 120 may receive the opposite background waveform from cancellation module 134. The opposite background waveform may then be output via output port 120 via sound signal 122 thereby reducing the background noise heard by the subscriber.

Example Network and Operating Environments

The following description sets forth some example telephony radio networks and non-limiting operating environments in which an audio interface adapted to reduce a subscriber voice according to an embodiment may be used. The below-described operating environments should be considered non-exhaustive, however, and thus the below-described network architecture merely shows an example network architecture in which aspects of various embodiments may be incorporated. One can appreciate, however, that aspects of an embodiment may be incorporated into now existing or future alternative architectures for communication networks.

The global system for mobile communication ("GSM") is one of the most widely-used wireless access systems in today's fast growing communication systems. GSM provides circuit-switched data services to subscribers, such as mobile telephone or computer users, for example. General Packet Radio Service ("GPRS"), which is an extension to GSM technology, introduces packet switching to GSM networks. GPRS uses a packet-based wireless communication technology to transfer high and low speed data and signaling in an efficient manner. GPRS optimizes the use of network and radio resources, thus enabling the cost effective and efficient use of GSM network resources for packet mode applications. For purposes of explanation, various embodiments are described herein in connection with GSM. The references to GSM are not exclusive, however, as it should be appreciated that embodiments may be implemented in connection with any type of wireless access system such as, for example, CDMA or the like.

As may be appreciated, the example GSM/GPRS environment and services described herein can also be extended to 3G services, such as Universal Mobile Telephone System ("UMTS"), Frequency Division Duplexing ("FDD") and Time Division Duplexing ("TDD"), High Speed Packet Data Access ("HSPDA"), cdma2000 1x Evolution Data Optimized ("EVDO"), Code Division Multiple Access-2000 ("cdma2000 3x"), Time Division Synchronous Code Division Multiple Access ("TD-SCDMA"), Wideband Code Division Multiple Access ("WCDMA"), Enhanced Data GSM Environment ("EDGE"), International Mobile Telecommunications-2000 ("IMT-2000"), Digital Enhanced Cordless Telecommunications ("DECT"), etc., as well as to other network services that shall become available in time. In this regard, the techniques of the various embodiments discussed below may be applied independently of the method of data transport, and does not depend on any particular network architecture, or underlying protocols.

Figure 3A:
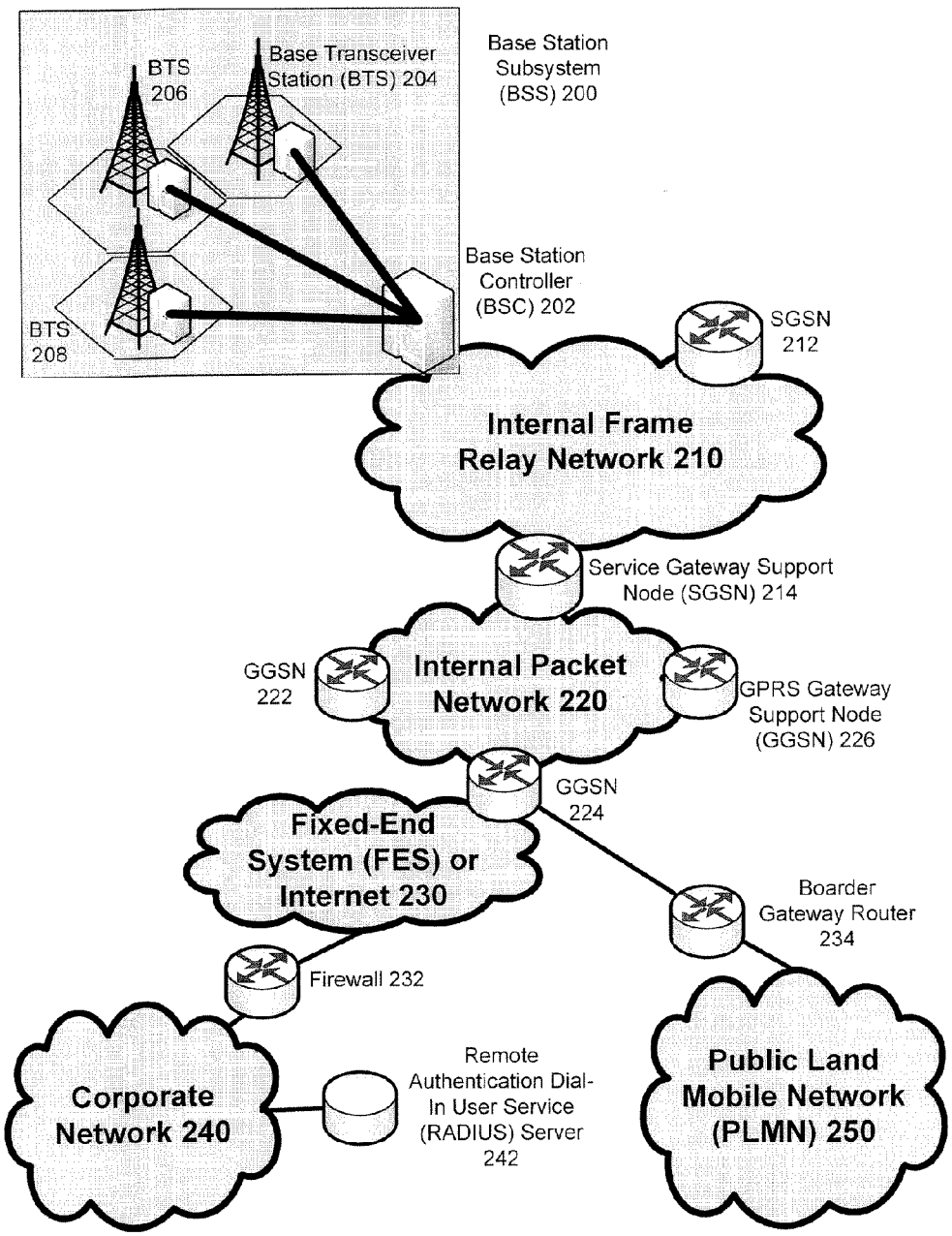
FIG. 3A illustrates an overview of a network environment in which aspects of an embodiment may be implemented.

FIG. 3A depicts an overall block diagram of an example packet-based mobile cellular network environment, such as a GPRS network, in which aspects of an embodiment may be practiced. In such an environment, there may be any number of subsystems that implement the functionality of the environment such as, for example, a plurality of Base Station Subsystems ("BSS") 200 (only one is shown in FIG. 3A), each of which comprises a Base Station Controller ("BSC") 202 serving a plurality of Base Transceiver Stations ("BTS") such as, for example, BTSs 204, 206 and 208. BTSs 204, 206, 208, etc., are the access points where users of packet-based mobile devices become connected to the wireless network. In one embodiment, the packet traffic originating from user devices is transported over the air interface to BTS 208, and from BTS 208 to BSC 202. Base station subsystems, such as BSS 200, may be a part of internal frame relay network 210 that may include Service GPRS Support Nodes ("SGSN") such as SGSN 212 and 214. Each SGSN 212, 214, etc. is in turn connected to internal packet network 220 through which SGSN 212, 214, etc. can route data packets to and from a plurality of gateway GPRS support nodes (GGSN) 222, 224, 226, etc. As illustrated, SGSN 214 and GGSNs 222, 224 and 226 are part of internal packet network 220. Gateway GPRS serving nodes 222, 224 and 226 may provide an interface to external Internet Protocol ("IP") networks such as Public Land Mobile Network ("PLMN") 250, corporate intranets 240, Fixed-End System ("FES"), the public Internet 230 or the like. As illustrated, subscriber corporate network 240 may be connected to GGSN 224 via firewall 232; and PLMN 250 may be connected to GGSN 224 via boarder gateway router 234. Remote Authentication Dial-In User Service ("RADIUS") server 242 may be used for caller authentication when a user of a mobile cellular device calls corporate network 240, for example.

Generally, there can be four different cell sizes in a GSM network macro, micro, pico and umbrella cells. The coverage area of each cell is different in different environments. Macro cells may be regarded as cells where the base station antenna is installed in a mast or a building above average roof top level. Micro cells are cells whose antenna height is under average roof top level; they are typically used in urban areas. Pico cells are small cells having a diameter is a few dozen meters; they are mainly used indoors. On the other hand, umbrella cells are used to cover shadowed regions of smaller cells and fill in gaps in coverage between those cells.

Figure 3B:
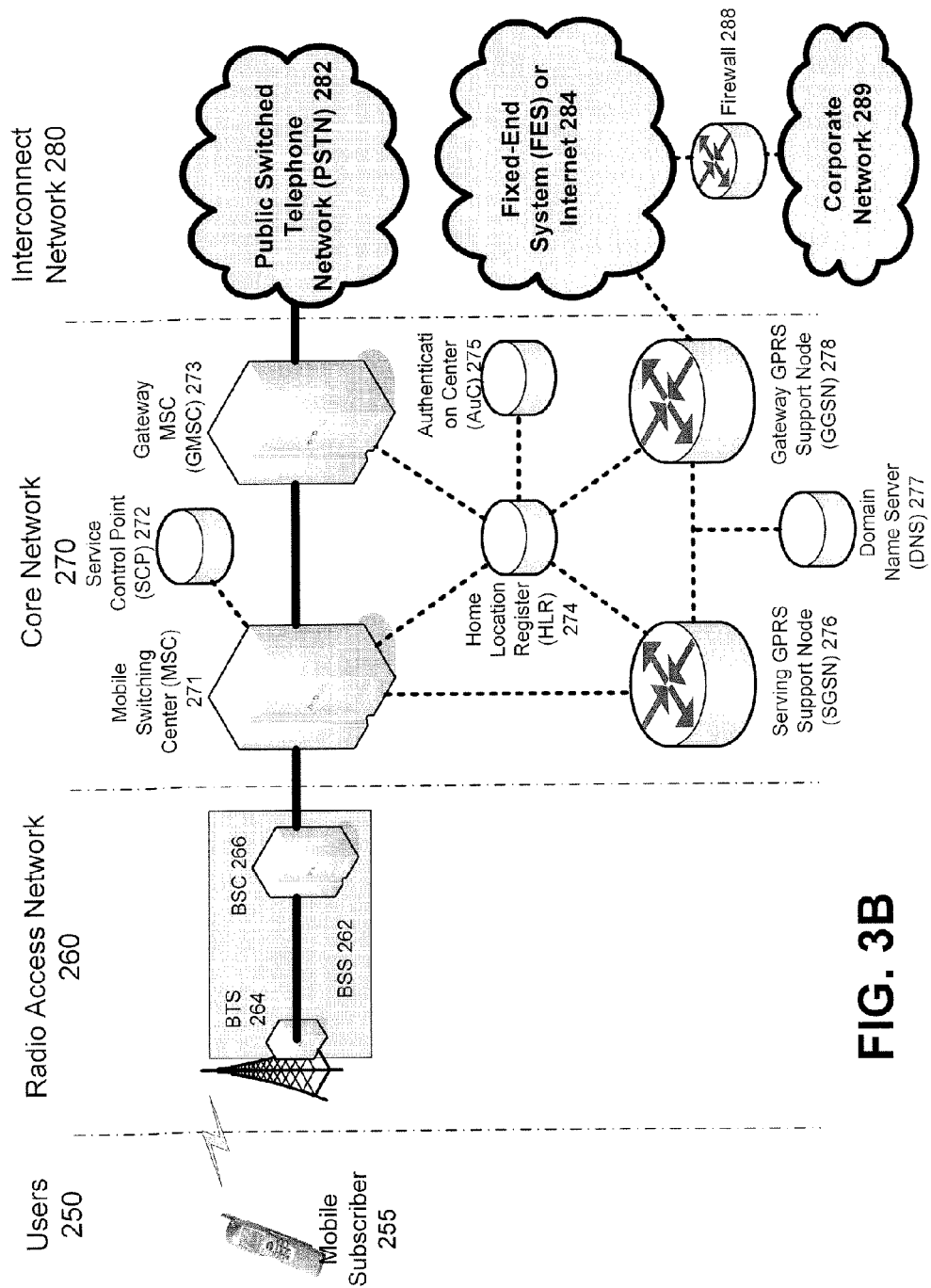
FIG. 3B illustrates a GPRS network architecture in which aspects of an embodiment may be implemented.

FIG. 3B illustrates the architecture of a typical GPRS network as segmented into four groups: users 250, radio access network 260, core network 270 and interconnect network 280. Users 250 comprise a plurality of end users (though only mobile subscriber 255 is shown in FIG. 7B). Radio access network 260 comprises a plurality of base station subsystems such as BSSs 262, which include BTSs 264 and BSCs 266. Core network 270 comprises a host of various network elements. As illustrated here, core network 270 may comprise Mobile Switching Center ("MSC") 271, Service Control Point ("SCP") 272, gateway MSC 273, SGSN 276, Home Location Register ("HLR") 274, Authentication Center ("AuC") 275, Domain Name Server ("DNS") 277 and GGSN 278. Interconnect network 280 also comprises a host of various networks and other network elements. As illustrated in FIG. 3B, interconnect network 280 comprises Public Switched Telephone Network ("PSTN") 282, Fixed-End System ("FES") or Internet 284, firewall 288 and Corporate Network 289.

A mobile switching center may be connected to a large number of base station controllers. At MSC 271, for example, depending on the type of traffic, the traffic may be separated such that voice may be sent to Public Switched Telephone Network ("PSTN") 282 through Gateway MSC ("GMSC") 273, and/or data may be sent to SGSN 276, which then sends the data traffic to GGSN 278 for further forwarding.

When MSC 271 receives call traffic, for example, from BSC 266, it may send a query to a database hosted by SCP 272. The SCP 272 processes the request and issues a response to MSC 271 so that it may continue call processing as appropriate.

HLR 274 is a centralized database for users to register to the GPRS network. HLR 274 stores static information about the subscribers such as the International Mobile Subscriber Identity ("IMSI"), subscribed services, and a key for authenticating the subscriber. HLR 274 also stores dynamic subscriber information such as the current location of the mobile subscriber. Associated with HLR 274 may be AuC 275. AuC 275 is a database that contains the algorithms for authenticating subscribers and includes the associated keys for encryption to safeguard the user input for authentication.

In the following, depending on context, the term "mobile subscriber" may refer to either the end user or to the actual portable device used by an end user of the mobile cellular service. When a mobile subscriber turns on his or her mobile device, the mobile device goes through an attach process by which the mobile device attaches to an SGSN of the GPRS network. Referring now to FIG. 3B, when mobile subscriber 255 initiates the attach process by turning on the network capabilities of the mobile device, an attach request is sent by mobile subscriber 255 to SGSN 276. The SGSN 276 queries another SGSN, to which mobile subscriber 255 was attached before, for the identity of mobile subscriber 255. Upon receiving the identity of mobile subscriber 255 from the other SGSN, SGSN 276 requests more information from mobile subscriber 255. This information is used to authenticate mobile subscriber 255 to SGSN 276 by HLR 274. Once verified, SGSN 276 sends a location update to HLR 274 indicating the change of location to a new SGSN, in this case SGSN 276. HLR 274 notifies the old SGSN, to which mobile subscriber 255 was attached, to cancel the location process for mobile subscriber 255. HLR 274 then notifies SGSN 276 that the location update has been performed. At this time, SGSN 276 sends an Attach Accept message to mobile subscriber 255, which in turn sends an Attach Complete message to SGSN 276.

After attaching itself with the network, mobile subscriber 255 then goes through the authentication process. In the authentication process, SGSN 276 sends the authentication information to HLR 274, which sends information back to SGSN 276 based on the user profile that was part of the user's initial setup. SGSN 276 then sends a request for authentication and ciphering to mobile subscriber 255. Mobile subscriber 255 uses an algorithm to send the user identification (ID) and password to SGSN 276. SGSN 276 uses the same algorithm and compares the result. If a match occurs, SGSN 276 authenticates mobile subscriber 255.

Next, mobile subscriber 255 establishes a user session with the destination network, corporate network 289, by going through a Packet Data Protocol ("PDP") activation process. Briefly, in the process, mobile subscriber 255 requests access to the Access Point Name ("APN"), for example, UPS.com (e.g., which can be corporate network 279) and SGSN 276 receives the activation request from mobile subscriber 255. SGSN 276 then initiates a Domain Name Service ("DNS") query to learn which GGSN node has access to the UPS.com APN. The DNS query is sent to the DNS server within the core network 270, such as DNS 277, which is provisioned to map to one or more GGSN nodes in the core network 270. Based on the APN, the mapped GGSN 278 can access the requested corporate network 279. The SGSN 276 then sends to GGSN 278 a Create Packet Data Protocol ("PDP") Context Request message that contains necessary information. The GGSN 278 sends a Create PDP Context Response message to SGSN 276, which then sends an Activate PDP Context Accept message to mobile subscriber 255.

Once activated, data packets of the call made by mobile subscriber 255 can then go through radio access network 260, core network 270, and interconnect network 280, in particular fixed-end system or Internet 284 and firewall 288, to reach corporate network 289.

Thus, network elements that may implicate the functionality of the service delivery based on real-time performance requirement(s) in accordance with an embodiment may include but are not limited to Gateway GPRS Support Node tables, Fixed End System router tables, firewall systems, VPN tunnels and any number of other network elements as required by the particular digital network.

Figure 3C:
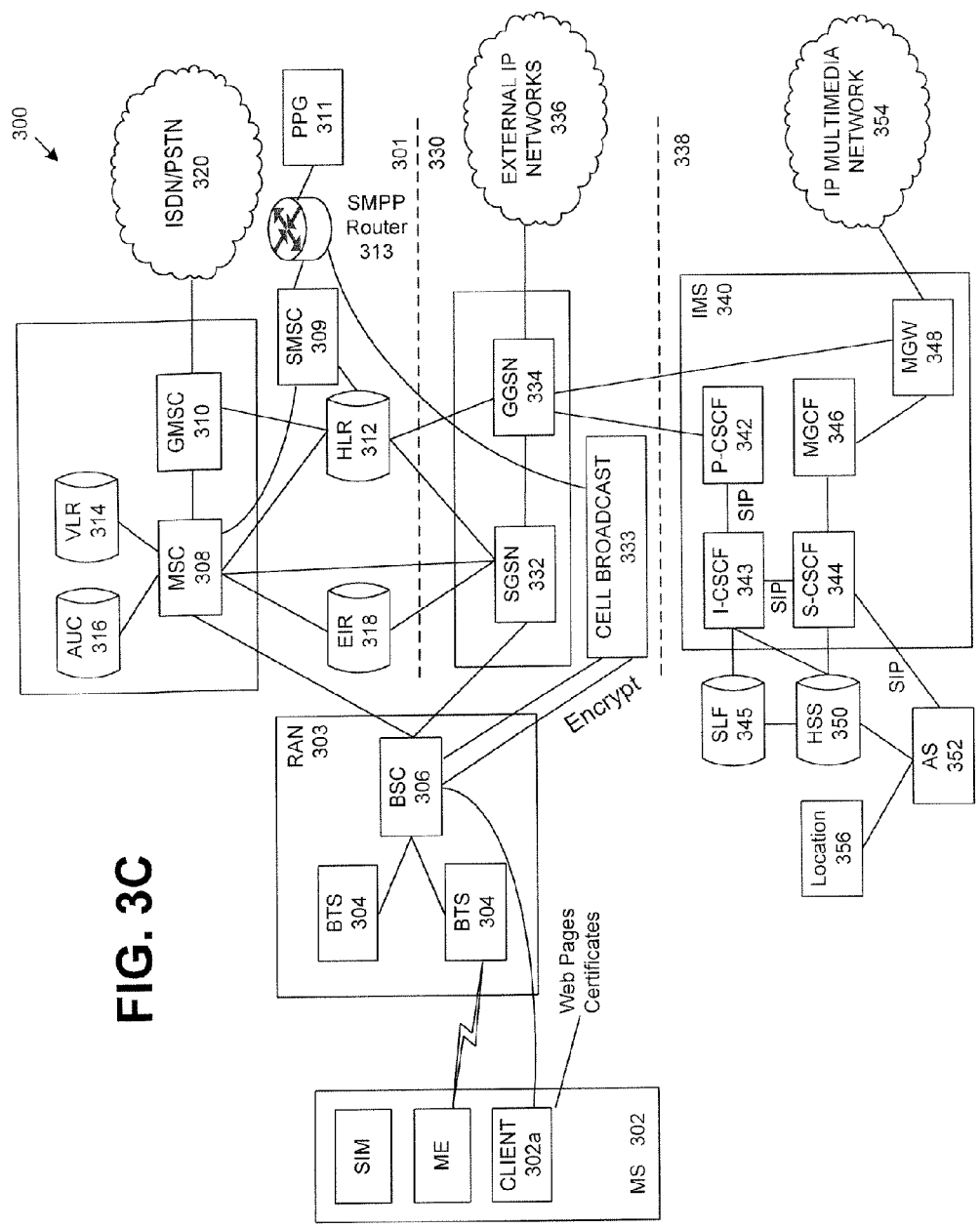
FIG. 3C illustrates an alternate block diagram of an example GSM/GPRS/IP multimedia network architecture in which aspects of an embodiment may be implemented.

FIG. 3C shows another example block diagram view of a GSM/GPRS/IP multimedia network architecture 300 in which the apparatus and methods for transferring multimedia content between receiving devices of the below-discussed embodiments may be incorporated. As illustrated, architecture 300 of FIG. 3C includes GSM core network 301, GPRS network 330 and IP multimedia network 338. GSM core network 301 includes Mobile Station (MS) 302, at least one Base Transceiver Station (BTS) 304 and Base Station Controller (BSC) 306. MS 302 is physical equipment or Mobile Equipment (ME), such as a mobile phone or a laptop computer that is used by mobile subscribers, with a Subscriber identity Module (SIM). The SIM includes an International Mobile Subscriber Identity (IMSI), which is a unique identifier of a subscriber. BTS 304 is physical equipment, such as a radio tower, that enables a radio interface to communicate with the MS. Each BTS may serve more than one MS. BSC 306 manages radio resources, including the BTS. The BSC may be connected to several BTSs. The BSC and BTS components, in combination, are generally referred to as a base station (BSS) or radio access network (RAN) 303.

GSM core network 301 also includes Mobile Switching Center (MSC) 308, Gateway Mobile Switching Center (GMSC) 310, Home Location Register (HLR) 312, Visitor Location Register (VLR) 314, Authentication Center (AuC) 318 and Equipment Identity Register (EIR) 316. MSC 308 performs a switching function for the network. The MSC also performs other functions, such as registration, authentication, location updating, handovers and call routing. GMSC 310 provides a gateway between the GSM network and other networks, such as an Integrated Services Digital Network (ISDN) or Public Switched Telephone Networks (PSTNs) 320. In other words, GMSC 310 provides interworking functionality with external networks.

HLR 312 is a database that contains administrative information regarding each subscriber registered in a corresponding GSM network. HLR 312 also contains the current location of each MS. VLR 314 is a database that contains selected administrative information from HLR 312. The VLR contains information necessary for call control and provision of subscribed services for each MS currently located in a geographical area controlled by the VLR. HLR 312 and VLR 314, together with MSC 308, provide the call routing and roaming capabilities of GSM. AuC 316 provides the parameters needed for authentication and encryption functions. Such parameters allow verification of a subscriber's identity. EIR 318 stores security-sensitive information about the mobile equipment.

Short Message Service Center (SMSC) 309 allows one-to-one Short Message Service (SMS) messages to be sent to/from MS 302. Push Proxy Gateway (PPG) 311 is used to "push" (i.e., send without a synchronous request) content to MS 102. PPG 311 acts as a proxy between wired and wireless networks to facilitate pushing of data to MS 302. Short Message Peer to Peer (SMPP) protocol router 313 is provided to convert SMS-based SMPP messages to cell broadcast messages. SMPP is a protocol for exchanging SMS messages between SMS peer entities such as short message service centers. It is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. MS 302 sends a location update including its current location information to the MSC/VLR, via BTS 304 and BSC 306. The location information is then sent to the MS's HLR. The HLR is updated with the location information received from the MSC/VLR. The location update also is performed when the MS moves to a new location area. Typically, the location update is periodically performed to update the database as location updating events occur.

GPRS network 330 is logically implemented on the GSM core network architecture by introducing two packet-switching network nodes, a serving GPRS support node (SGSN) 332, a cell broadcast and a Gateway GPRS support node (GGSN) 334. SGSN 332 is at the same hierarchical level as MSC 308 in the GSM network. The SGSN controls the connection between the GPRS network and MS 302. The SGSN also keeps track of individual MS's locations and security functions and access controls.

Cell Broadcast Center (CBC) 333 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

GGSN 334 provides a gateway between the GPRS network and a public packet network (PDN) or other IP networks 336. That is, the GGSN provides interworking functionality with external networks, and sets up a logical link to the MS through the SGSN. When packet-switched data leaves the GPRS network, it is transferred to external TCP-IP network 336, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services can be used in parallel. The MS can operate in one three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time.

A class B MS can attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

GPRS network 330 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not received pages from a circuit switched domain when engaged in a data call, since the MS is receiving data and is not listening to a paging channel In a NOM3 network, a MS can monitor pages for a circuit switched network while received data and vise versa.

IP multimedia network 338 was introduced with 3GPP Release 5, and includes IP multimedia subsystem (IMS) 340 to provide rich multimedia services to end users. A representative set of the network entities within IMS 340 are a call/session control function (CSCF), media gateway control function (MGCF) 346, media gateway (MGW) 348, and a master subscriber database, referred to as a home subscriber server (HSS) 350. HSS 350 may be common to GSM network 301, GPRS network 330 as well as IP multimedia network 338.

IP multimedia system 340 is built around the call/session control function, of which there are three types: interrogating CSCF (I-CSCF) 343, proxy CSCF (P-CSCF) 342 and serving CSCF (S-CSCF) 344. P-CSCF 342 is the MS's first point of contact with IMS 340. P-CSCF 342 forwards session initiation protocol (SIP) messages received from the MS to an SIP server in a home network (and vice versa) of the MS. P-CSCF 342 may also modify an outgoing request according to a set of rules defined by the network operator (for example, address analysis and potential modification).

I-CSCF 343 forms an entrance to a home network and hides the inner topology of the home network from other networks and provides flexibility for selecting an S-CSCF. I-CSCF 343 may contact subscriber location function (SLF) 345 to determine which HSS 350 to use for the particular subscriber, if multiple HSSs 350 are present. S-CSCF 344 performs the session control services for MS 302. This includes routing originating sessions to external networks and routing terminating sessions to visited networks. S-CSCF 344 also decides whether application server (AS) 352 is required to receive information on an incoming SIP session request to ensure appropriate service handling. This decision is based on information received from HSS 350 (or other sources, such as application server 352). AS 352 also communicates to location server 356 (e.g., a Gateway Mobile Location Center (GMLC)) that provides a position (e.g., latitude/longitude coordinates) of MS 302.

HSS 350 contains a subscriber profile and keeps track of which core network node is currently handling the subscriber. It also supports subscriber authentication and authorization functions (AAA). In networks with more than one HSS 350, a subscriber location function provides information on HSS 350 that contains the profile of a given subscriber.

The MGCF 346 provides interworking functionality between SIP session control signaling from IMS 340 and ISUP/BICC call control signaling from the external GSTN networks (not shown). It also controls media gateway (MGW) 348 that provides user-plane interworking functionality (e.g., converting between AMR- and PCM-coded voice). MGW 348 also communicates with other IP multimedia networks 354.

Push to Talk over Cellular (PoC) capable mobile phones register with the wireless network when the phones are in a predefined area (e.g., job site, etc.). When the mobile phones leave the area, they register with the network in their new location as being outside the predefined area. This registration, however, may not indicate the actual physical location of the mobile phones outside the pre-defined area.

While the various embodiments have been described in connection with the preferred embodiments of the various figures, it is to be understood that other similar embodiments may be used or modifications and additions may be made to the described embodiment for performing the same function of the various embodiments without deviating therefrom. Therefore, the embodiments should not be limited to any single embodiment, but rather should be construed in breadth and scope in accordance with the appended claims.

What is claimed:

1. A method comprising:
   receiving, from a first direction, a subscriber voice from an input port of a wireless device;
   processing a voice waveform corresponding to the subscriber voice to generate a substantially opposite voice waveform that is substantially out of phase from the voice waveform;
   providing feedback to a subscriber that indicates a direction associated with the subscriber to optimize a reduction of the subscriber voice to a non-subscriber using the substantially opposite voice waveform; and
   providing the substantially opposite voice waveform.

2. The method of claim 1, further comprising:
   receiving background noise from the input port of the wireless device;
   processing a background waveform corresponding to the background noise to generate a substantially opposite background waveform that is substantially out of phase from the background waveform; and
   providing the substantially opposite background waveform substantially toward the subscriber.

3. The method of claim 2, wherein the substantially opposite background waveform is provided via an output port.

4. The method of claim 3, further comprising providing the substantially opposite voice waveform in substantially the opposite direction from the first direction wherein the substantially opposite voice waveform is provided via a voice cancellation output port that is different from said output port.

5. The method of claim 1, wherein the voice cancellation output port comprises a speaker.

6. A device comprising:
   a processor configured to:
   receive from a first direction, a subscriber voice from an input port of the device;
   process a voice waveform corresponding to the subscriber voice to generate a substantially opposite voice waveform that is substantially out of phase from the voice waveform;
   provide feedback to a subscriber that indicates a direction associated with the subscriber voice to optimize a reduction of the subscriber voice to a non-subscriber using the substantially opposite voice waveform; and
   provide the substantially opposite voice waveform.

7. The device of claim 6, wherein said processor is further configured to:
   receive background noise from the input port of the wireless device;
   process a background waveform corresponding to the background noise to generate a substantially opposite background waveform that is substantially out of phase from the background waveform; and
   provide the substantially opposite background waveform substantially toward the subscriber.

8. The device of claim 7, wherein the substantially opposite background waveform is provided via an output port.

9. The device of claim 8, further comprising providing the substantially opposite voice waveform in substantially the opposite direction from the first direction wherein the substantially opposite voice waveform is provided via a voice cancellation output port that is different from said output port.

10. The device of claim 9, wherein the voice cancellation output port comprises a speaker.

* * * * *

UNITED STATES PATENT AND TRADEMARK OFFICE
CERTIFICATE OF CORRECTION

| | | |
|---|---|---|
| PATENT NO. | : 7,996,048 B1 | Page 1 of 1 |
| APPLICATION NO. | : 11/615156 | |
| DATED | : August 9, 2011 | |
| INVENTOR(S) | : Jeffrey Mikan et al. | |

It is certified that error appears in the above-identified patent and that said Letters Patent is hereby corrected as shown below:

<u>Title Page,</u>
Item (57) ABSTRACT:
Line 3, delete "to the" (second occurrence).

<u>Column 13,</u>
Line 31, delete "claim 1" and insert -- claim 4 --.

Signed and Sealed this
Twentieth Day of December, 2011

David J. Kappos
*Director of the United States Patent and Trademark Office*